United States Patent [19]

Flasch

[11] Patent Number: 5,186,743
[45] Date of Patent: Feb. 16, 1993

[54] LOW VOLATILE ORGANIC CONTENT HYBRID SILICA BINDER

[75] Inventor: John R. Flasch, Adrian, Mich.

[73] Assignee: Akzo nv, Arnhem, Netherlands

[21] Appl. No.: 783,957

[22] Filed: Oct. 29, 1991

Related U.S. Application Data

[63] Continuation-in-part of Ser. No. 626,925, Dec. 13, 1990, abandoned.

[51] Int. Cl.$^5$ ................................................ B28B 7/34
[52] U.S. Cl. ........................... 106/38.35; 106/287.16; 106/287.35; 106/403; 252/315.6
[58] Field of Search ............... 106/1.17, 14.44, 287.14, 106/287.16, 38.2, 38.25, 38.35

[56] References Cited

U.S. PATENT DOCUMENTS

| | | | |
|---|---|---|---|
| 2,842,445 | 7/1958 | Emblem et al. | 106/38.35 |
| 3,412,063 | 11/1968 | Jarboe et al. | 260/37 |
| 3,576,652 | 4/1971 | Teicher et al. | 106/38.35 |
| 3,615,730 | 10/1971 | Law et al. | 106/1 |
| 3,682,668 | 8/1972 | Fujita et al. | 106/74 |
| 3,961,968 | 6/1976 | Wales | 106/38.35 |
| 4,378,996 | 4/1983 | Yarwood | 106/38.35 |
| 4,602,667 | 7/1986 | Moore et al. | 164/7.1 |

FOREIGN PATENT DOCUMENTS 335350 10/1989 European Pat. Off. .

*Primary Examiner*—William R. Dixon, Jr.
*Assistant Examiner*—Margaret Einsmann
*Attorney, Agent, or Firm*—Richard P. Fennelly; Louis A. Morris

[57] ABSTRACT

A low volatile organic content hybrid silica binder, with a total silica content of about 29% to about 42% by weight, suitable for use in the manufacture of zinc-rich primer coating compositions is disclosed. The binder comprises a predominant amount of a silica component derived from the hydrolysis of an organic silicate and a lesser amount of a silica component derived from a sillica sol. The solvent component comprises no more than about 75% by weight of an organic solvent having a volatility equal to or greater than the volatility of a $C_1$ to $C_3$ alkyl monohydric alcohol and about 25% by weight or more of a solvent having a lesser volatility than the volatility of a $C_1$ to $C_3$ alkyl monohydric alcohol, with the condition that no more than about 90% by weight of such lesser volatile solvent is a butanol.

17 Claims, No Drawings

LOW VOLATILE ORGANIC CONTENT HYBRID SILICA BINDER

This is a continuation-in-part of U.S. Ser. No. 626,925, filed Dec. 13, 1990 now abandoned.

BACKGROUND OF THE INVENTION

Various disclosures exist in the art in regard to hybrid silica binders which contain one component derived from colloidal silica and another component derived from an organic silicate (e.g., tetraethyl silicate). U.S. Pat. Nos. 2,842,445 and 3,576,652 have been characterized as showing binder formulations prepared with low colloidal silica sol and high organic ethyl silicate volumes. U.S. Pat. No. 3,682,668 to Fujita et al. has been characterized as showing high organic ethyl silicate levels. All three of these patents are indicated as being "binders of alcoholic base" (see U.S. Pat. No. 3,961,968 at Col. 1, lines 46-63, for example).

U.S. Pat. No. 3,961,968 to W. F. Wales describes hybrid binders for ceramic molds where the silica ratio (i.e., $SiO_2$ content ratio) between organic and inorganic constituents is controlled in the range of 0.09 to 0.9 with a teaching of preferred levels of organic silicate of only 5-10 vol % with the colloidal silica sol range being in the range of 30-75 vol %. This patent advocates use of a glycol ether solvent in excess (i.e., 66.6% or greater based on the total amount of glycol ether and alcohol) to any amounts of alcohol that might be present.

U.S. Pat. No. 4,378,996 to D. Yarwood also generally relates to hybrid binders of organic silicates and inorganic sols in which the resulting "stable" product preferably has a greater than 50% $SiO_2$ (silica) derivation attributable to the silica sol made possible by a reduction in the amount of water in the silica sol component by either dewatering the sol (e.g., by distillation under reduced pressure) or by replacing the water with a polyhydric alcohol, such as ethylene glycol. Although this patent speaks of replacing the water in the sol with a polyhydric alcohol, it does not indicate that light organic fractions (such as alcohol by-product from the hydrolysis of the organic silicate) are to be removed from the hybrid binder.

SUMMARY OF THE INVENTION

The instant hybrid binder product comprises a predominant amount of silica derived from an organic silicate and a lesser amount derived from a silica sol with the solvent component in the hybrid binder comprising at least about 25% by weight of an organic solvent having a lower level of volatility than the type of alcohol solvents (i.e., a $C_1$ to $C_3$ alkyl monohydric alcohol) which generally are used with prior art binders unless steps are taken to replace them, with the balance of the binder solvent component comprising up to about 75% by weight of the more volatile $C_1$ to $C_3$ alkyl monohydric alcohols and/or other organic solvents (e.g., acetone and t-butanol) of equal or greater volatility to the said $C_1$ to $C_3$ alkanols. The instant invention also includes the process for obtaining such a product by first combining a silica sol with an organic silicate in a suitable solvent (e.g., an acidified alcoholic solvent), followed by hydrolysis of the organic silicate to form silica therefrom with formation of by-product $C_1$ to $C_4$ alkyl alcohol. A sufficient amount of the total $C_1$ to $C_3$ alkyl monohydric alcohols and/or the previously described other equal or more volatile organic solvents present at this stage are then removed to reduce, after substitution with (addition of) the solvent of lower volatility than a $C_1$ to $C_3$ alkyl monohydric alcohol, the combined amount of the $C_1$ to $C_3$ alkyl monohydric alkanol and/or other equal or more volatile organic solvent remaining to a level of about 75% by weight or less based upon total weight of all of the solvents present in the final hybrid binder of this invention. The total $C_1$ to $C_3$ alkyl monohydric alcohols present before their partial removal, as above, are the former $C_1$ to $C_3$ alkanol(s) from the initial solvent, if necessary, and/or from alcohol by-product formed.

DETAILED DESCRIPTION OF THE INVENTION

Prehydrolyzed hybrid binders with relatively high silica contents (as $SiO_2$) of about 29% and greater that are prepared by the process of this invention are surprisingly both stable and still effective as vehicles for inorganic zinc-rich primers. Related in large part to their high silica content levels, these novel binder vehicles possess the environmentally desirable feature that they can be successfully formulated into effective zinc primer paints which contain significantly reduced and low volatile organic compound (i.e., "VOC") levels of 2.9 pounds per gallon (350 g/L) and less compared to the present widely-used, mineral acid-catalyzed and prehydrolyzed alkyl silicate zinc-rich primers, the latter which typically contain VOC levels of about 3.4 lbs/gal (410 g/L) and higher.

The prior art hybrid silicate binder technology does not employ the ready-to-use, essentially anhydrous binder compositions of this invention, which, in combination, contain a predominant amount of silica derived from an alkyl orthosilicate, which have a relatively high silica content level of at least about 29% by weight, and which additionally contain the relatively high levels (in the solvent component of the binder) of organic solvents of sufficiently low volatility.

The combination of high binder silica content and the presence of relatively high levels of sufficiently low volatile organic solvents in the binder directly makes possible the preparation of binder compositions and zinc metal primer formulations containing such a binder composition, which exhibit the commercially important characteristic of significantly reduced volatile organic compound (VOC) content emission levels and which can be successfully spray-applied, for example, onto ferrous metal structures or parts by conventional air spray or by airless spray techniques, under both temperate (e.g., approximately 70° F. and 50% relative humidity) and hot and humid (approximately 80° F. or greater and 70% or higher relative humidity) atmospheric weather conditions. It has been a general experience in the protective coatings industry that higher solids coatings (e.g., lower "VOC", including those which contain higher than standard silica content binder vehicles) are more difficult (if at all possible) to successfully spray onto substrates to be coated compared to the current and traditional lower solids versions of these coatings. Frequently, higher solids coatings require a basic change in the technology of the lower, standard solids equivalent coatings for successful application and performance parameters of the higher solids coatings to be achieved.

For the reasons given in the following discussion, the binder compositions described by Fujita et al., when optionally formulated to the high binder silica levels of the present invention, cannot be successfully applied as an effective low VOC zinc-rich primer to steel by at least conventional air pressure pot spray methods under especially hot and humid weather conditions. The n-butanol, iso-butyl alcohol and/or sec-butyl alcohol solvents which in certain embodiments can be incorporated into the binder total solvent compositions of Fujita, the latter which includes solvent added for hydrolysis and hydrolysis by-product alcohol formed, are solvents of lower volatility than the volatility of the more volatile $C_1$ to $C_3$ alkyl monohydric alcohols, the degree of volatility being defined as and described by the evaporation rate of the solvent at standard conditions (i.e., approximately 20°–25° C. and 760 mm Hg atmospheric pressure).

On a relative volatility scale, where the evaporation rate of n-butyl acetate is arbitrarily set at 1.0, the evaporation rate of the lesser volatile n-BuOH, iso-BuOH and sec-BuOH solvents of Fujita are lower values of approximately 0.5, 0.7 and 0.9, respectively. (On a similar scale anhydrous ethyl alcohol has a greater evaporation rate of approximately 2.6 and n-propanol about 1.0). In Example 1 in the instant specification, the binder added solvent of lesser volatility than the $C_1$ to $C_3$ alkyl monohydric alcohols, that is, the 80:20 percent by weight mixture of monopropylene glycol monomethyl ether and dipropylene glycol monomethyl ether, has an evaporation rate of 0.25. When this 32% silica content binder was formulated into a zinc dust metal primer of low VOC level (i.e., 2.8–2.9 lbs VOC/gal.) and applied by another laboratory to steel test panels by conventional air spray equipment, the primer was able to be successfully applied to the panels under the "temperate" atmospheric conditions then existing, but was marginally close to a "dry spray" condition which would be aggravated under the hot and humid ambient conditions frequently encountered during primer applications in especially the coastal, near coastal and/or southern regions of the United States. "Dry spray" is defined as a condition in which an excessive amount of solvent in the atomized primer evaporates off during primer spray application and before the primer can be uniformly deposited on the substrate being primed. This condition creates a rough, sandpaper-like appearance to the primer and results in the zinc dust pigment particles being more loosely bound in the primer film and in the applied primer commonly having reduced corrosion resistance in the surface areas of the dry spray.

As an improvement to the binder in Example 1 given below, the binder composition described in Example 4 of the instant invention has a hybrid silicate resin composition approximately the same as the resin composition of the binder in Example 1 and a silica content of 32.8%, but the binder from Example 4 has a mixture of solvents of "lesser volatility than the $C_1$ to $C_3$ alkyl monohydric alcohols" (i.e., a mixture of 70 weight percent methyl n-amyl ketone and 30 weight percent dipropylene glycol monomethyl ether), which has a lower evaporation rate of approximately 0.15–0.20 compared to the 0.25 evaporation rate for the corresponding "lesser volatile" solvent component mixture present in the binder from Example 1. A zinc dust primer which was formulated from the Example 4 binder to a low VOC content of 2.8–2.9 lbs./gal. was successfully and easily applied to steel test panels by the same other laboratory in a conventional air spray test under hot and humid ambient atmospheric conditions of approximately 80° F. and 90–98% relative humidity. Primer application under these conditions would not have been possible with the binder composition from Example 1, which had a higher 0.25 evaporation rate for the solvent components of "lesser volatility than the $C_1$ to $C_3$ alkyl monohydric alcohols" and which, as stated before, was marginally close to a primer dry spray condition under even the less demanding temperate atmospheric conditions.

Fujita's above-mentioned various butyl alcohol solvents with approximate 0.5–0.9 evaporation rates which are appreciably higher than the 0.25 evaporation rate of the "lesser volatile" solvent mixture in the binder composition of Example 1, when used exclusively as the solvent of lesser volatility than the $C_1$ to $C_3$ alkyl monohydric alcohols in binder vehicle formulations which contain high (i.e., approximately 28–30% by weight and greater) silica levels, would be even more susceptible to cause dry spray in low VOC zinc primers and give difficulty in primer application by conventional air spray techniques under the elevated and greater than temperate ambient temperature and relative humidity conditions commonly experienced in commercial zinc priming applications. Under even temperate atmospheric conditions, difficulties with conventional air spray application of low VOC zinc primers formulated from Fujita's various butyl alcohol solvent-based binders of high silica content are expected. At the minimum, there would be a need to consider reformulating the essentially only butyl alcohol-containing solvent component which is of lesser volatility than a $C_1$ to $C_3$ alkyl monohydric alcohol in Fujita with at least several percent of a much slower evaporating solvent possessing an estimated required evaporation rate of below 0.10, in order to improve the expected spray characteristics of low VOC zinc dust primers formulated from high solids binder compositions of Fujita. Even with these modifications, it is not known or certain whether such primers could be successfully spray applied to steel substrates and whether they would produce integral and effective barrier films.

The initial step in practicing the present invention entails the formation of a hybrid silica intermediate product from appropriate amounts of silica sol, organic silicate, and (preferably) solvent. In general, the relative amount of organic silicate will predominate over the silica sol component. It is deemed that the weight percentage of the former can range from about 68%–90% by weight of both silica components. Advantageously, an alcohol solvent medium (e.g., ethanol) is used in an amount preferably lying between the amount of organic silicate and amount of silica sol.

The silica sol component can be derived from inorganic sources of silica and is well known to persons of ordinary skill in the art. It can contain about 15% to about 65% by weight of silica in an aqueous, acidic or alkaline medium or, alternatively, contained in an organic (e.g., alcohol or glycol ether) solvent system as disclosed in the prior art for colloidal silica. A suitable way to manufacture such an alkaline sol is by adding sodium hydroxide and silicic acid to an alkali silicate and passing the mixture through an ion exchange resin. One way in which acidic sol is made is by passing silica sol through an ion exchange pump in which sodium is the counter ion and exchanges with hydrogen ion.

The solvent which can be used in the instant invention to function as a mutual hydrolysis solvent for the normally immiscible silica sol and alkyl silicate can be a water-miscible organic compound, including a ketone such as acetone, a glycol ether (e.g., monopropylene glycol monomethyl ether), or a $C_1$ to $C_4$ alkyl monohydric alcohol, such as ethanol, isopropanol, or the like. The presence of a water-immiscible solvent (e.g., an organic hydrocarbon solvent such as xylene), though it can be used, is generally not recommended during the hydrolysis reaction, as such water-immiscible solvents reduce the ethyl silicate hydrolysis reaction rate compared to the rates of reaction achieved with the above-preferred water-miscible organic compounds.

The alkyl silicate usable herein is one or the well-known lower tetraalkyl ($C_1$-$C_4$ alkyl) orthosilicates with the preferred being exemplified by tetraethyl orthosilicate. The hydrolysis of this silicate component can be brought about by its slow addition to an alcoholic or organic solvent-containing aqueous solution of the acidic or acidified silica sol at temperatures ranging from ambient up to the reflux temperature of the alcohol. Strong inorganic mineral acids such as hydrochloric, sulfuric, phosphoric and the like, along with requisite strength organic acids, may be utilized to acidify the silica sol and function as the hydrolysis catalyst.

The hydrolysis of tetraalkyl orthosilicates involves the formation of alkyl polysilicate species and by-product alkyl alcohol to produce a binder according to the following equation:

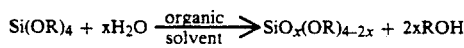

$$Si(OR)_4 + xH_2O \xrightarrow[\text{solvent}]{\text{organic}} SiO_x(OR)_{4-2x} + 2xROH$$

In this instant invention the R moiety is a $C_1$ to $C_4$ alkyl group and "x" is the total number of moles of water present (from the aqueous silica sol component and optionally from any free water and/or other added sources of water) in the hydrolysis reaction system. Reaction of two moles of water per mole of tetraalkyl orthosilicate is considered as being required for substantially complete hydrolysis of the orthosilicate.

Without being bound or limited by the specifics of the reaction, it is likely that some of the silanol (i.e., —SiOH) groups that are on the surface of the colloidal-size $SiO_2$ particles of the acidified silica sol chemically react or bond with some of the silanol and/or —OR ester moieties on the alkyl (poly)silicate to result in the hybrid silicate resin compositions of this invention.

One important consideration of this invention is adjusting the aqueous silica sol to tetraalkyl orthosilicate ratio such that the resulting degree of hydrolysis of the alkyl silicate is high enough to yield binder vehicles which produce sufficiently fast curing zinc-rich primer films. Levels of hydrolysis of about 70%-90% for the instant hybrid binders based on tetraethyl orthosilicate are generally preferred to achieve a balance of acceptable primer cure rate and sufficient binder stability and long enough zinc primer pot life.

In all discussions in this invention of the relative amount of solvents present of "equal or greater volatility to the $C_1$ to $C_3$ alkyl monohydric alcohols" to the amount of solvents present of "lesser volatility" than the same above $C_1$ to $C_3$ alcohols, the amount of alcohol by-product formed in the above hydrolysis reaction equation is calculated as being a component part of the hybrid binder's total solvent system.

Additionally, because of the complexity of the subject, none of the solvent component descriptions, calculations or related and subject claims takes into account or includes previously published data that certain organic solvents can react with the tetraethyl orthosilicate and ethyl polysilicate hydrolysis products to cause a change in the quantity of the various solvents that are actually present in the solvent component of the binder compositions of this invention. As a common example, higher boiling (and usually "less volatile") hydroxy-containing organic solvents present (e.g., a glycol ether) will "ester exchange" with some of the —$OC_2H_5$ ester moieties in the tetraethyl orthosilicate under the acid conditions present. This type of reaction will consume some of the higher boiling and usually less volatile components in the hybrid binder solvent component and will increase the quantity of the lower boiling and usually more volatile ethyl alcohol that would be present as a component of the binder solvent. Reactions of tetraethyl orthosilicate with organic ester solvents can also change the ratios of lower volatile to more volatile solvents that are present in the total solvent component of the binder.

In general, the respective amounts of silica sol, organic silicate, and solvent preferably employed will generally range from about 5% to about 25%, by weight, from about 50% to about 80%, and from about 15% to about 30%, respectively, with more preferred values being 8%-23%, 55%-70%, and 20%-26%, respectively. The amount of silica component derived from the organic silicate in the final product will range from about 52% to about 95%, by weight of the total weight of the silica in the final binder composition.

The foregoing described product is then distilled to remove a significant (i.e., generally at least about 35 weight percent) amount of the volatile, light organics component (usually mostly ethanol) contained therein. In general terms the amount of light organics removed will comprise about 20% to about 50% of the original weight of the product before distillation of the light organics. The silica content of the resulting intermediate product after light organics are removed will, in general, be in the neighborhood of from about 37% to about 45%, by weight.

Optionally, an aliphatic and/or aromatic hydrocarbon, for example, or other solvent, having an equal or greater level of volatility than the volatility range of a $C_1$ to $C_3$ alkyl monohydric alkanol, can be added to the hydrolyzed organic silicate-silica sol composition either immediately before, during or, preferably, after the removal by distillation of the above-said volatile, light organics component. If added, the amount of hydrocarbon or other solvent should be adjusted so that the silica content of the resulting intermediate product, after light organics are removed and after any said addition of hydrocarbon or other solvent is made, will, in general, also be in the neighborhood of around 37% to 45% by weight. If performed, a reason for this optional hydrocarbon or other solvent addition would or could be to affect the economics of the solvent component of the final binder composition of this invention and/or to adjust (e.g.) the spray application and/or curing characteristics of a zinc primer made from said final binder composition.

The resulting intermediate product is then combined with a lesser amount (e.g., about 5%-55%, by weight of the product) of one or more solvents having a lower volatility than the aforementioned lower $C_1$ to $C_3$ alkyl alcohol, such as ethanol. As mentioned before, lower volatility is defined as having an evaporation rate at standard conditions lower (i.e., slower) than that of the lower $C_1$ to $C_3$ alkyl monohydric alcohols (and, necessarily, acetone). This step produces the desired hybrid binder, which is derived in part from relatively high levels of organic silicate and yet which has a desirable low volatile organics content (VOC) when at the viscosity normally required for use in a product such as a zinc-rich paint. One preferred class of above-mentioned "lower volatility" solvent to add to achieve such a low VOC content is a mono-, di-, tri- or tetraalkylene glycol mono- or dialkyl ether (or mixture thereof). Representative glycol ethers are the ethylene base glycol ethers (e.g., ethylene glycol monobutyl ether) although the methylene, propylene and butylene base variants can also be employed, such as monopropylene glycol monomethyl ether.

Other potentially advantageous solvents that may be added are the glycol ether acetates, propionates or butyrates. A $C_4$ or higher monohydric liquid alcohol can also be used. Examples would be sec-butyl alcohol or benzyl alcohol. Also, a polyhydric alcohol such as ethylene glycol can be used. Ketones, such as methyl n-amyl ketone and diacetone alcohol can advantageously be employed. Organic esters such as isobutyl isobutyrate can also be used. Other solvents can include ether esters (e.g., ethyl 3-ethoxypropionate); ester alcohols (e.g., TEXANOL brand solvent); dibasic organic esters such as Du Pont's DBE product; aliphatic or aromatic hydrocarbons, including mineral spirits and para-xylene; and cyclic lactams such as n-methyl-2-pyrrolidone. All the above solvents have a lower degree of volatility (as defined above) than either acetone or a $C_1$-$C_3$ alkyl monohydric alcohol.

The binder described hereinbefore is, as alluded to before, especially adapted and preferred for use in zinc-rich primers which, as known to persons of ordinary skill in the art, generally contain fine zinc powder and/or optionally zinc flake in amounts ranging from about 50% to about 80% by weight of the foregoing binder and zinc metal pigment along with conventional additives (e.g., fillers, extenders, coloring pigments, thixotropic agents, etc.) for such primers. Typical fillers and extenders that could be used include mica and diatomaceous silica, as well as di-iron phosphide extender for some of the zinc metal pigment in the primer. High purity iron oxide and BENTONE amine-modified clay are typical examples of coloring pigments and thixotropic agents, respectively, that can be used. Curing accelerators such as trimethyl borate, tetraalkyl titanate esters, including tetra n-butyl titanate, zinc chloride or other acid metal salts, and the like, though not necessarily required to formulate binders and primers with sufficiently fast curing rates, can be employed as modifiers for the zinc primer binder vehicle. Various prior art organic resins (e.g., polyvinyl butyrals) can also be used. Such modifiers can increase the adhesion, mud-crack resistance and/or other desired properties of the zinc-rich primer film.

The hybrid binders of this invention are stable higher $SiO_2$ content (lower VOC) binders which can be formulated into zinc primers of lower than standard VOC levels. As an example, a standard ethyl silicate binder (as shown in the Table below) has a volatiles organic matter content (ASTM D 2369-87) of about 71%, by weight, whereas the hybrid binder of Example 4, for example, has a VOC of about 57.5%. Such a lower VOC has a distinct advantage for environmental reasons where reduced organic solvent emissions to the atmosphere during primer curing are now possible.

The present invention is illustrated by the Examples which follow.

EXAMPLE 1

Aqueous, alkaline colloidal silica containing 50 wt % silica content (264 parts by weight) was added to a reactor followed by 2.8 parts by weight of sulfuric acid (96%) to sufficiently acidify the colloidal silica and act as a catalyst for the subsequent hydrolysis reaction. Then, 360 parts by weight of anhydrous ethanol solvent was added to the acidified colloidal silica followed by the slow addition of 942 parts by weight of tetraethyl orthosilicate containing 28.7% silica ($SiO_2$) on an equivalent basis. The latter slow addition was made at from near room temperature up to about the reflux temperature (78° C.) of the ethyl alcohol during which time the ethyl silicate hydrolyzed. The resulting reaction mixture was held at the reflux temperature of the alcohol for about one hour.

The resulting product contained a total of about 1,036 parts by weight of ethanol, which amount was derived from both the originally added ethanol as well as 676 parts by weight of ethanol by-product from the hydrolysis reaction. Then, about 566 parts by weight of the light fraction (primarily ethanol) was distilled from the aforementioned product to yield about 1000 parts by weight of an intermediate product with an $SiO_2$ content of about 40-41%. To this intermediate product was added 281 parts by weight of a mixed 80:20 (w/w) propylene glycol monomethyl ether-dipropylene glycol monomethyl ether product and a small amount (e.g., about 1 part by weight) of sulfuric acid for pH control to yield the final product of about 32% $SiO_2$ content. The physical properties were:

Color: white, milky liquid.
Specific Gravity: 1.053 at 20° C.
Acidity: 0.07 wt % ($H_2SO_4$)
Flash Point: 78° F. (25.5° C.)—Tagliabue Closed Cup.
Freezing Point: below $-40°$ C.
Nonvolatile Solids: 41% by wt (ASTM D 2369-87).
Viscosity: 7 cs at 25° C.

This binder was tested in the laboratory for its zinc primer film curing characteristics (Reference: Example 5) and for its primer spray application capabilities.

EXAMPLE 2

An intermediate product as defined hereinbefore was obtained by a procedure similar to the one described in Example 1 with the exception that 2530 parts by weight of silica sol, 37 parts of 96% sulfuric acid, 3,640 parts of anhydrous ethanol, and 9700 parts of tetraethyl orthosilicate were used. After removal of a majority of the light fraction by distillation, approximately 10,000 parts by weight of an intermediate product (39.5% by weight $SiO_2$ content) was obtained.

To 732 parts by weight of this product were added 268 parts of an 80:20 (w/w) mixture of monopropylene glycol monomethyl ether and dipropylene glycol monomethyl ether. The acidity of the final product was adjusted with sulfuric acid to approximately 0.07 weight percent as sulfuric acid titrated acidity.

This binder was tested in the laboratory for its zinc primer film cure characteristics, as reviewed in Example 5.

EXAMPLE 3

To another 732 weight part portion of the intermediate from Example 2 was added 253 parts of the same glycol ether mixture used in Examples 1 and 2. Acidity was adjusted to about 0.07 weight percent as sulfuric acid and then 15 weight parts of 70% trimethyl borate in methanol (TMB-70 brand) was added to obtain the final binder composition.

A zinc primer film cure evaluation was performed on this binder in the laboratory. (Reference: Example 5).

EXAMPLE 4

An intermediate product was again prepared as described in Example 1, in this instance with 107 weight parts of aqueous alkaline colloidal silica (50 wt. % silica content), 1.1 weight parts of 96% sulfuric acid, 146 parts by weight of anhydrous ethanol solvent and 382 weight parts of tetraethyl orthosilicate. After distillation of 228 weight parts of ethanol from the hydrolyzed reaction mixture and addition of 0.6 weight parts of 96% sulfuric acid, the resulting intermediate product contained 39.8 percent by weight of silica as $SiO_2$ and 0.097 weight percent sulfuric acid.

To prepare the binder composition, 50 weight parts of methyl n-amyl ketone and 21.4 parts by weight of dipropylene glycol monomethyl ether were added to 320 weight parts of the above intermediate, yielding a final binder composition containing 32.8 percent silica by weight. As with the binder of Example 1, this binder was tested in the laboratory for its zinc primer film curing properties (Example 5) and for its primer spray application characteristics.

EXAMPLE 5

Standard zinc-rich primers were prepared from each binder from Examples 1–4. Each primer was brushed onto polished steel test panels in the laboratory to an approximate 1.5 to 2.0 mil dry film thickness and tested as shown in the following Table:

TABLE

| Binder | Vehicle[1] | Silica[2] | Clay[3] | Zinc Dust[4] | Primer Cure Hardness[5] | Primer Pot Life[6] |
|---|---|---|---|---|---|---|
| Ex. 1 | 16.3 | 1.4 | 0.3 | 50 | 3B–F | 5 days |
| Ex. 2 | 16.3 | 1.4 | 0.3 | 50 | <6B | 62 days |
| Ex. 3 | 16.3 | 1.4 | 0.3 | 50 | 4B | 51 days |
| Ex. 4 | 16.3 | 1.4 | 0.3 | 50 | 3B+ | 7 days |
| Control* | 16.3 | 1.4 | 0.3 | 50 | 3B–F | 2–4 days |

All additions are weight parts.
*SILBOND H-6C brand from Akzo Chemicals which contains ethyl polysilicate in a glycol ether-alcohol solvent system and comprises 18 wt % silica as $SiO_2$.
[1]the vehicle in the first four entries is the hybrid binder from Examples 1–4.
[2]diatomaceous silica filler (CELITE 499 brand, Johns-Manville).
[3]amine-modified clay (BENTONE 27 brand, NL Industries).
[4]Grade No. 44 from New Jersey Zinc Co., median size: 7 microns.
[5]after 24 hours curing at 70° F.–80° F. and 40–60% relative humidity. Pencil hardness values—order of increasing hardness: 6B, 4B, 3B, F, H, 2H, etc.
[6]age to gelation of sealed primer at 70–77° F.

All of the above coatings were integral and free of mud cracks.

The foregoing Examples are presented to illustrate particular embodiments of the present invention and, for that reason, should not be construed in a limiting sense. The scope of protection sought is set forth in the claims which follow.

I claim:

1. An acidified, substantially non-aqueous silica hybrid binder, which contains from about 29% to about 42% total silica expressed as $SiO_2$, exclusive of any added quantity of curing accelerators, other modifiers, or mixtures thereof, and which comprises:
    (a) a predominant amount of a silica component derived from the hydrolysis of an organic silicate and a lesser amount of a silica component derived from a silica sol; and
    (b) a solvent component which contains:
        (i) from 0 to about 75% by weight of an organic solvent having a volatility equal to or greater than the volatility of a $C_1$ to $C_3$ alkyl monohydric alkanol; and
        (ii) from about 25% to 100% by weight of a solvent having a lesser volatility than the volatility of a $C_1$ to $C_3$ alkyl monohydric alkanol, said solvent of lesser volatility optionally containing no more than about 90%, by weight, of a solvent selected from the group consisting of n-butyl alcohol, iso-butyl alcohol and sec-butyl alcohol.

2. A binder as claimed in claim 1 wherein the silica component derived from the organic silicate ranges from about 52% to about 95% by weight of the total silica present.

3. A binder as claimed in claim 2 wherein the organic silicate is tetraethyl orthosilicate.

4. A binder as claimed in claim 1 wherein the solvent having the lesser volatility is a glycol ether.

5. A binder as claimed in claim 1 wherein the solvent having the lesser volatility is a ketone.

6. A binder as claimed in claim 2 wherein the silica component is derived from tetraethyl orthosilicate and the solvent having the lesser volatility is a glycol ether.

7. A binder as claimed in claim 2 wherein the silica component is derived from tetraethyl orthosilicate and the solvent having the lesser volatility is a ketone.

8. A process for forming the hybrid binder of claim 1 which comprises:
    (a) combining a silica sol and a hydrolyzable organic silicate under acidic conditions;
    (b) hydrolyzing the organic silicate forming silica and by-product alcohol;
    (c) removing an amount of one or more of:
        (1) the alcohol in the product from step (b);
        (2) any $C_1$ to $C_3$ alkyl monohydric alcohol solvent added to the system either before, during or after the organic silicate hydrolysis; and
        (3) any other organic solvent that may be present which is of an equal or more volatile nature than the $C_1$ to $C_3$ alkyl monohydric alcohols; and
    (d) adding to the resulting intermediate product from step (c) a solvent having a lesser volatility than a $C_1$ to $C_3$ alkyl monohydric alcohol, such that the total solvent composition of the final solvent-diluted hybrid binder product comprises at least about 25% by weight of a solvent having a lesser volatility than the volatility of a $C_1$ to $C_3$ alkyl monohydric alkanol.

9. A process as claimed in claim 8 wherein the organic silicate is an alkyl silicate and the solvent added in step (d) is a glycol ether.

10. A process as claimed in claim 8 wherein the organic silicate is an alkyl silicate and the solvent added in step (d) is a ketone.

11. A zinc-rich primer which comprises zinc powder and the silica hybrid binder of claim 1.

12. A zinc-rich primer which comprises zinc powder and the silica hybrid binder of claim 2.

13. A zinc-rich primer which comprises zinc powder and the silica hybrid binder of claim 3.

14. A zinc-rich primer which comprises zinc powder and the silica hybrid binder of claim 4.

15. A zinc-rich primer which comprises zinc powder and the silica hybrid binder of claim 5.

16. A zinc-rich primer which comprises zinc powder and the silica hybrid binder of claim 6.

17. A zinc-rich primer which comprises zinc powder and the silica hybrid binder of claim 7.

* * * * *